United States Patent [19]

Ichimura et al.

[11] Patent Number: 5,625,633
[45] Date of Patent: Apr. 29, 1997

[54] LASER LIGHT GENERATING APPARATUS

[75] Inventors: Isao Ichimura; Atsushi Fukumoto, both of Kanagawa, Japan

[73] Assignee: Sony Corporation, Tokyo, Japan

[21] Appl. No.: 404,693

[22] Filed: Mar. 15, 1995

[30] Foreign Application Priority Data

Mar. 15, 1994 [JP] Japan ................................. 6-044218

[51] Int. Cl.$^6$ .......................................................... H01S 3/13
[52] U.S. Cl. ....................................... 372/32; 372/38
[58] Field of Search ............................ 372/20, 32, 38, 372/107

[56] References Cited

U.S. PATENT DOCUMENTS

| | | | |
|---|---|---|---|
| 4,468,773 | 8/1984 | Seaton | 372/32 |
| 4,817,101 | 3/1989 | Wyeth et al. | 372/32 |
| 4,905,244 | 2/1990 | Wyeth et al. | 372/32 |
| 4,951,287 | 8/1990 | Wyeth et al. | 372/32 |
| 5,381,230 | 1/1995 | Blake et al. | 372/32 |

FOREIGN PATENT DOCUMENTS 5-243661  9/1993  Japan .

Primary Examiner—Rodney B. Bovernick
Assistant Examiner—Robert E. Wise
Attorney, Agent, or Firm—Charles M. Fish, Esq.; Pasquale Musacchio, Esq.; Jerry A. Miller

[57] ABSTRACT

A resonator length can reliably be set in its locked state in the laser light generating apparatus having the resonator. The laser light generating apparatus has a nonlinear optical crystal device disposed in the resonator, at least one of reflection devices composing the resonator can be moved by an actuator to lock the resonator length with the frequency of the fundamental wave laser light. A sample-held resonator length error signal and a resonator reflected light intensity signal are used as the setting signal when the resonator length is locked by the frequency of the fundamental wave laser light.

9 Claims, 9 Drawing Sheets

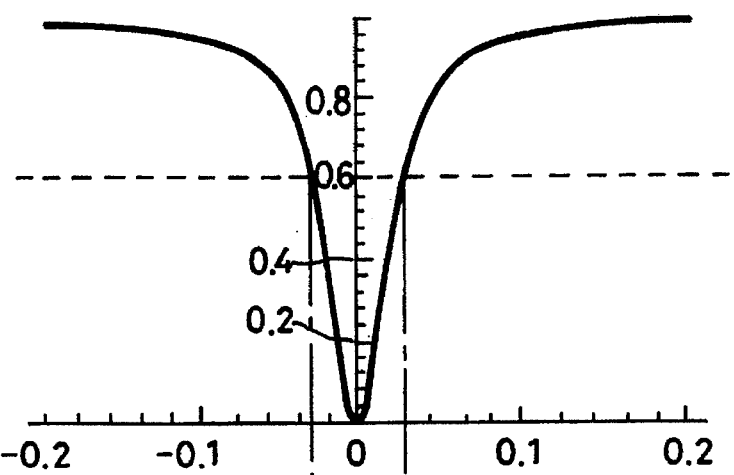
FIGURE 3A
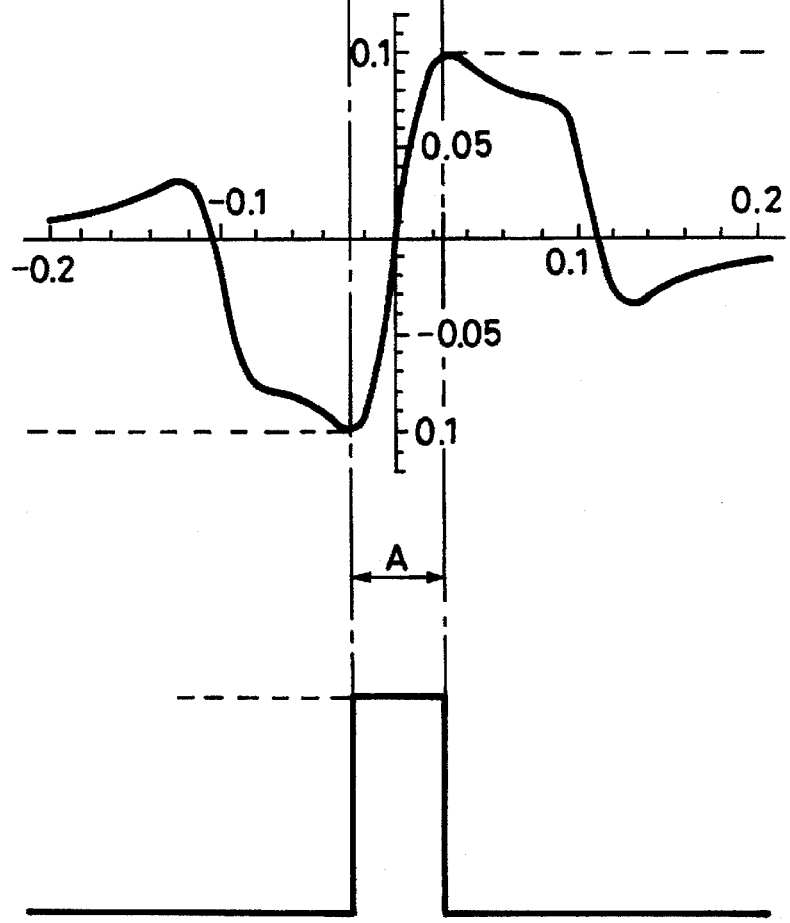
FIGURE 3B
FIGURE 3C

LASER LIGHT GENERATING APPARATUS

FIELD OF THE INVENTION

The present invention relates to a laser light generating apparatus. More particularly, the present invention relates to a laser light generating apparatus which generates laser light whose wavelength is converted by a nonlinear optical crystal device.

BACKGROUND

There has been proposed a laser light generating apparatus in which a nonlinear optical crystal device is disposed in a resonator. The nonlinear optical crystal device converts a wavelength of a fundamental wave laser light incident therein efficiently by utilizing a high power density in the resonator.

There has been proposed two kinds of laser light generating apparatus. A laser light generating apparatus has a wavelength converting device disposed in a resonator. A nonlinear optical crystal device such as an SHG (second harmonic generation) device is used as a wavelength converting device. This laser light generating apparatus is called "external resonator SHG apparatus". In this case, a fundamental wave light source is not located in the resonator. Another laser light generating apparatus has a wavelength converting device and a fundamental wave light source located in a resonator. This laser light generating apparatus is usually used as a fundamental wave light source for the external resonator SHG apparatus.

The SHG apparatus of external resonator type is explained as follows. A nonlinear optical crystal device is disposed between a pair of reflection mirrors composing an external resonator thereof. A fundamental wave laser light is incident on the external resonator and passed through the nonlinear optical crystal device. The resonator length of the external resonator is selected to resonate with a frequency (wavelength) of incident laser light.

The SHG apparatus of external resonator type increases a so-called finesse value (which corresponds to a Q value of resonance) of the resonator to a value ranging from 100 to 1000. The increase of the finesse value increase an optical density in the resonator several hundred times as much as an optical density of incident light. Therefore a nonlinear effect of the nonlinear optical crystal device in the resonator becomes efficient.

As a light source of the fundamental wave laser light for the SHG apparatus of external resonator type, there can be used the laser light generating apparatus in which a laser medium and a nonlinear optical crystal device are disposed between a pair of reflection means composing the laser resonator. Here, a SHG device can be used as a nonlinear optical crystal device. In this case, the laser light generated by radiating a pumping light on the laser medium in the laser resonator is supplied as the fundamental wave to the nonlinear optical crystal device disposed in the resonator. The fundamental wave laser light is converted to a higher harmonic wave laser light. The harmonic wave laser light is made incident on the above external resonator, and then made incident on the nonlinear optical crystal device in the external resonator.

As described above, in the laser light generating apparatus which obtains a laser light of a second harmonic wave or a laser light, such as a higher harmonic wave, a sum frequency wave or the like through wavelength conversion, a change (error) of an optical path in the external resonator should be set to a range from 1/1000 to 1/10,000 of the resonator length. In particular, a position of the external resonator should be controlled within an extremely high accuracy such as 1 Angstrom (Å) or smaller.

Therefore, there has been proposed a method wherein the resonator length can be automatically controlled to stabilize the resonance operation for the incident laser light on the external resonator. In this method, the reflection means composing the resonator are movable, which can be moved by the actuator minutely in the optical axis direction. A servo loop is constructed, in which an error signal in proportion to difference of the resonator length with respect to the laser light incident on the resonator is fed back to the actuator.

One of the methods for obtaining the error signal is a Drever Locking (Drever Locking) method in which the fundamental wave laser light is frequency-modulated (FM) or phase-modulated (PM) with a constant frequency. Then intensity and phase of reflected light from the external resonator are detected to thereby obtain the error signal with high accuracy (see R. W. P. Drever et al. "Laser Phase and Frequency Stabilization Using an Optical Resonator", Applied Physics B 31. 97–105 (1983)).

A principle of detecting the error signal thereof will be described briefly which is disclosed in Japanese Laid-open Patent Publication No. 5-243661.

When the SHG device having a refractive index n and a thickness T is disposed in the Fabry-Perot resonator, various constants are defined as follows:

T: transmittance obtained when the light is traveled in the single optical path $\eta$: SHG conversion efficiency of the SHG device obtained when the light is traveled in the single optical path $R_1$: reflectivity of incidence plane $R_2$: reflectivity of reflection plane Here, a reflectivity $R_m$ upon reflection plane including a loss caused by a round-trip travel of the light in the resonator is given by the following Equation (1). A complex reflectivity r of the light reflected by the resonator is represented by the following Equation (2).

$$R_m = R_2 \, (T(1 - \eta))^2 \qquad (1)$$

$$r = \frac{\sqrt{R_1} - \sqrt{R_m} \; e^{j\Delta}}{1 - \sqrt{R_1 R_m} \; e^{j\Delta}} \qquad (2)$$

A reflected light intensity $|r|^2$ and its phase at this time are shown in FIGS. 7 and 8, respectively. Side bands (fc±fm) relative to the frequency fc of the laser light incident on the resonator are set by a phase modulator of a frequency fm. A beat between the frequency fc and the frequencies (fc±fm) of returning light from the resonator of a resonating frequency $f_0$ is detected, thereby obtaining the error signal having polarity.

Here, if a modulation index in the phase modulation is represented by a symbol $\beta$ and an electric field of a fundamental light source is represented by Equation of $E = E_0 \, e^{j\omega_c t}$, the electric field obtained after modulation is given by Equation (3).

$$E = E_0 \exp[j\omega_c t + \beta \sin \omega_m t] \qquad (3)$$

$$(\omega_c = 2\pi f_c, \; \omega_m = 2\pi f_m)$$

If this Equation (3) is developed by using Bessel function, Equation (4) is obtained.

$$E = E_0 \, (J_0 \, (\beta) \, \exp[j\omega_C t] + \qquad (4)$$
$$J_1 \, (\beta) \, \{\exp[j(\omega_C + \omega_m)t] - \exp[j(\omega_C - \omega_m)t]\} +$$
$$J_2 \, (\beta) \, \{\exp[j(\omega_C + 2\omega_m)t] + \exp[j(\omega_C - 2\omega_m)t]\} \dots )$$

In Equation (4), when the modulation index $\beta$ is smaller than 0.2, terms of $J_2(\beta)$ or higher can be disregarded in Equation 4. Therefore it is substantially sufficient to consider only the value $\omega_c$ and the two side bands $(\omega_c \pm \omega_m)$. Accordingly, the electric field E can be represented by the following Equation 5.

$$E = E_0 \, (J_0(\beta) \exp[j\omega_c t] + J_1(\beta)\{\exp[j(\omega_c + \omega_m)t] - \exp[j(\omega_c - \omega_m)t]\})(5)$$

The complex reflectivity is calculated in each term of the Equation (5) so that the electric field of the reflected light from the resonator is represented by Equation (6).

$$E = E_0 \, (J_0(\beta) r(\Delta_c) \exp[j\omega_c t] + \qquad (6)$$
$$J_1(\beta)\{r(\Delta_{c+m}) \exp[j(\omega_c + \omega_m)t] -$$
$$r(\Delta_{c-m}) \exp[j(\omega_c - \omega_m)t]\}$$

where $$\Delta = \frac{4\pi n L}{\lambda_c} = \frac{2nL\omega}{Vc} ,$$

$$\Delta = \frac{2nL(\omega + \omega)}{Vc} ,$$

$$\Delta = \frac{2nL(\omega - \omega)}{Vc}$$

Here, since $\beta$ is smaller than 0.2, the values of $J_0(\beta)$ and $J_1(\beta)$ can be made approximate as $$J(\beta)\sqrt{1 - \frac{\beta}{2}} \; , \; J(\beta)\frac{\beta}{2}$$

If the above values are substituted in Equation (6) and terms having a value $\beta$ of second degree or higher are disregarded, then the intensity $|E|^2$ of the reflected light can be represented by Equation (7).

$$|E|^2 = E_0^2 \, |r(\Delta_c)|^2 + \qquad (7)$$
$$\beta \, E_0^2 \, R_e \, [r(\Delta_c)^*(\Delta_{c+m}) - r(\Delta_c)^*(\Delta_{c-m})] \cos\omega_m t +$$
$$\beta \, E_0^2 \, I_m \, [r(\Delta_c)^*(\Delta_{c+m}) + r(\Delta_c)^*(\Delta_{c-m})] \sin\omega_m t$$

A DC component of a detected signal of the intensity of the reflected light is cut and the signal is multiplied with a value sin $\omega t$ obtained by applying a proper phase to an original modulated signal. When a component of a wave $(2\omega_m)$ having twice frequency is removed from the signal by a low-pass filter, only the term of $\beta \, E_0^2 \, I_m \, [r(\Delta_c)^*(\Delta_{c+m}) + r(\Delta_c)^*(\Delta_{c-m})]$ can be obtained. This term is set as a resonator-length error signal. Then, a servo for locking the resonator length can be effected, using the resonator-length error signal.

Specifically, as shown by a solid curve in FIG. 3A, the intensity of the reflected light from the resonator indicates a minimum value (dark light) in a resonating state of the resonator and indicates a high level (bright light) in a non-resonating (non-matched) state. The resonator error signal obtained as described above is obtained as a signal shown by a solid line in FIG. 3B. The cavity length servo is effected when the signal crosses an intensity level of 0.

However, in this case, the intensity of the reflected light from the resonator is discrete as shown in FIG. 9. Therefore, the error signal obtained only when the resonator is brought in its resonating state is discrete so that the error signal cannot constantly be obtained. Further, as shown in FIG. 3, a region A where the error signal can be obtained is considerably narrow so that a width of the region A is at most several tens Å, about 6 Å, for example, obtained by conversion into the resonator length. However, an interval of the error signal is 1000 times as wide as the region A, so that it is difficult to reliably set the resonator length into its locked state.

SUMMARY OF THE INVENTION

One object of the present invention is to provide a stable laser light generating apparatus.

According to the present invention, a laser light generating apparatus includes a light source generating a light beam of a fundamental wave length and a resonator having a pair of reflection devices reflecting the light beam of the fundamental wave length. A non-linear optical crystal device is located between the reflection devices and generates a light beam of harmonic when the light beam of the fundamental wave length is input thereto. Further, the laser light generating apparatus includes a driving device for moving at least one of the reflection devices to control a resonator length of the resonator so that the resonator resonates in the fundamental wave length.

More further, the laser light generating apparatus includes a first detection device for detecting the light beam of the fundamental wave length output and a control means for setting the driving device in its locked state. A resonator length error signal and a resonator reflected light intensity signal are generated based on a detection signal obtained from the first detection device, the resonator length error signal is sample-held based on the resonator reflected light intensity signal and the driving device is set based on the sample-held resonator length error signal.

BRIEF DESCRIPTION OF THE DRAWINGS

FIG. 3(A) is a graph showing a resonator reflected light intensity.

FIG. 3(B) is a graph showing a resonator-length error signal.

FIG. 3(C) is a diagram showing a detection signal.

DESCRIPTION OF THE INVENTION

Figure 1:
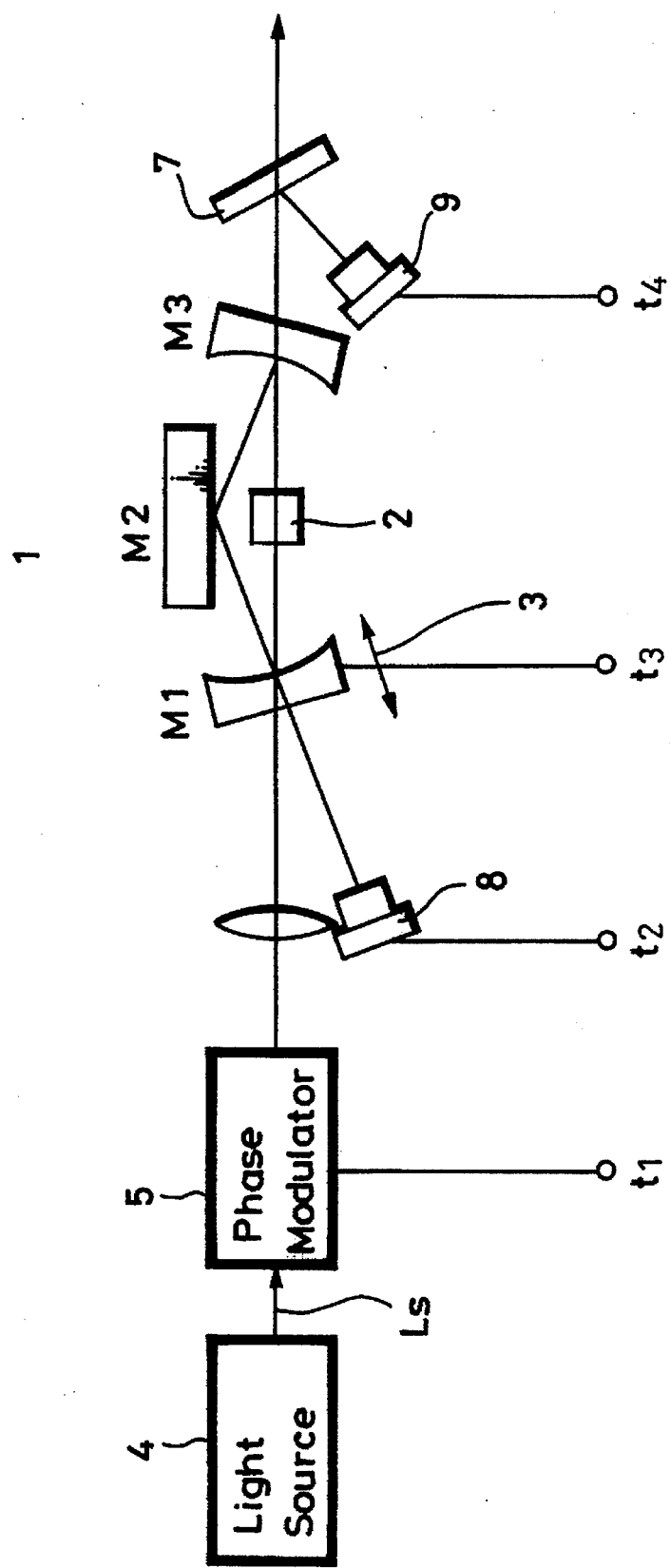
FIG. 1 is a schematic view showing an optical system of a laser light generating apparatus according to an embodiment of the present invention.

FIG. 1 shows an embodiment of a laser light generating apparatus of the present invention. A nonlinear optical crystal device 2 is disposed in a resonator 1. At least one reflection device $M_1$ composing the resonator 1 has an actuator 3 to change a resonator length minutely, and the resonator length of the resonator 1 is locked by a frequency of a laser light incident on the nonlinear optical crystal device 2, e.g., fundamental wave laser light in this embodiment. A sampled and held resonator-length error signal and reflected light from the resonator are used as a setting signal to lock the resonator length by the frequency of the incident laser light.

There is provided a wavelength conversion device in which the nonlinear optical crystal device 2 made of BBO ($\beta$-BaB$_2$O$_4$), for example, is disposed as the SHG device in the resonator 1. The resonator is called "external resonator" having a round-trip optical path formed by disposing three mirrors $M_1$, $M_2$ and $M_3$ as the reflection devices. A laser light Ls from a light source 4, which is the fundamental wave laser light, is phase-modulated by a phase modulator 5 formed of an EO (electro-optical effect) device, an AO (acousto-optical effect) device and so on. Then the phase-modulated laser light is input to the resonator 1 through an optical lens system 6.

At least one reflection device composing the resonator 1 such as the reflection device $M_1$ in this embodiment is arranged by the actuator 3 as the movable reflection device which can be minutely moved in the optical axis direction of an optical path between the reflection devices $M_1$ and $M_2$.

For example, an electromagnetic actuator can be used as the actuator 3. The electromagnetic actuator can have the similar arrangement to an electromagnetic actuator disclosed in the above-mentioned Japanese Laid-open Patent Publication No. 5-243661.

In this embodiment, the BBO is used for the nonlinear optical crystal device 2. A laser light of single mode with its wavelength of 532 nm is emitted from the light source 4. The laser light is input to the reflection device $M_1$ as its fundamental wave laser light. Thus, an ultraviolet (UV) output laser light with its wavelength of 266 nm which is a second harmonic of the fundamental wave is output from a beam splitter 7 through the reflection device $M_3$.

In this case, a concave mirror provided on an inside plane of the reflection device $M_1$ provided on the input side of the external resonator 1 and the reflection plane of the intermediate reflection device $M_2$ are formed as mirrors each having high reflectivity with respect to the fundamental wave laser light (the incident laser light). The reflection device $M_3$ provided on the output side thereof is formed as a dichroic mirror which has similar high reflectivity with respect to the fundamental wave laser light but has high transmittance with respect to the UV output laser light that is the second harmonic thereof.

The resonator length of the external resonator 1 is locked by the light incident thereon, which is a frequency of the fundamental laser light. Specifically, the resonator length of the external resonator 1 is locked at a resonator length allowing the fundamental wave laser light to resonate.

A first detection device 8 detects intensity of the resonator reflected light from the external resonator 1, that is a returning light intensity of the incident laser light. The first detection device 8 such as a photo diode is provided outside of the reflection device $M_1$ and on an extended optical axis of an optical path between the reflection devices $M_1$ and $M_2$.

A second detection device 9 for monitoring the output light such as a photo diode is disposed on an optical path branched by the beam splitter 7 provided the output side of the external resonator 1.

Figure 2:
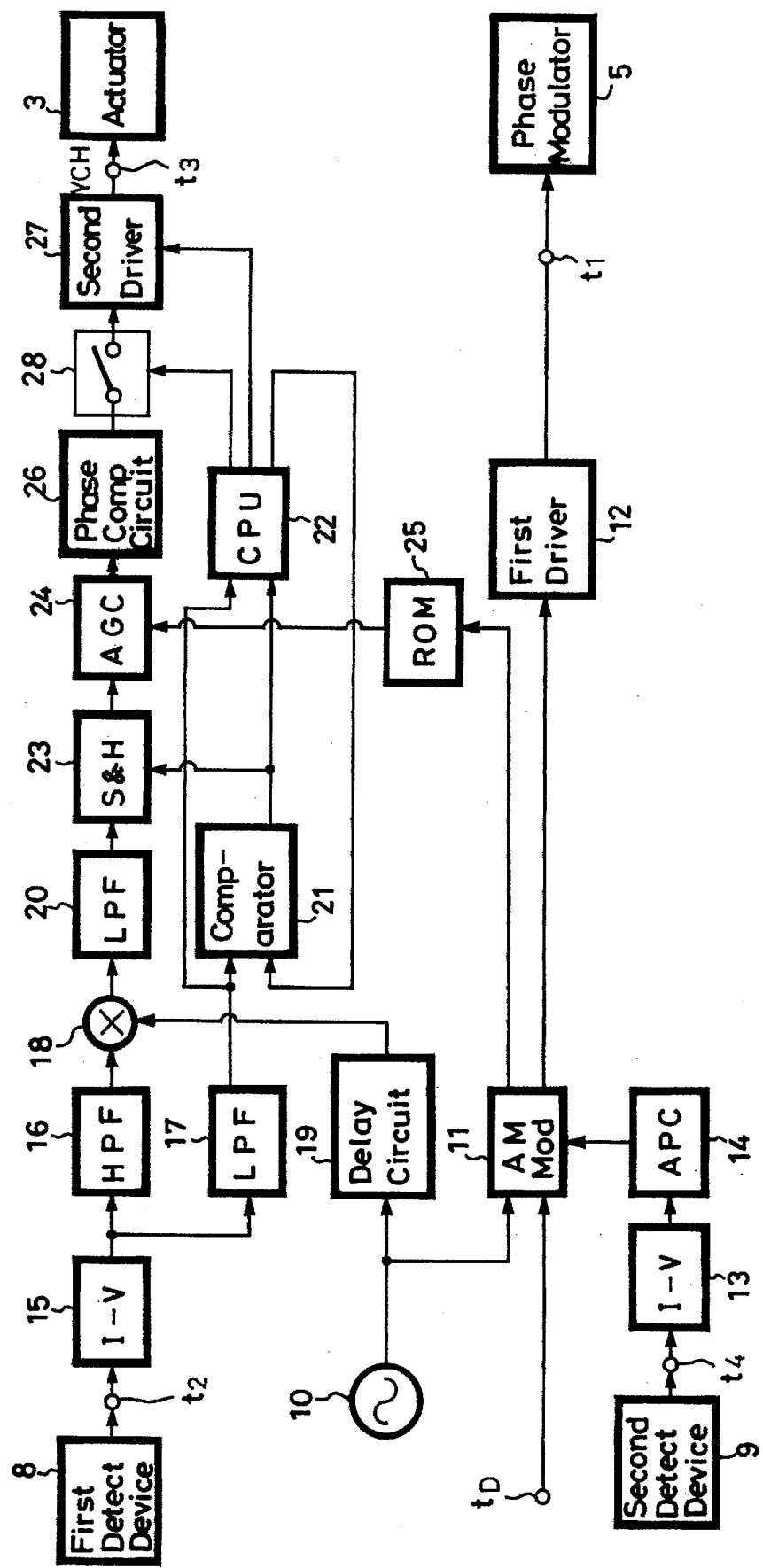
FIG. 2 is a block diagram showing a circuit system of a laser light generating apparatus according to an embodiment of the present invention.

FIG. 2 is a block diagram showing an example of a circuit system of the laser light generating apparatus according to the present invention. A terminal $t_1$ is an input terminal of the phase modulator 5. A terminal $t_2$ is an output terminal of the first detection device 8 for detecting the reflected light intensity of the resonator 1. A terminal $t_3$ is a supply terminal of a drive current for a drive electromagnetic coil of the actuator 3 such as an electromagnetic actuator. A terminal $t_4$ is an output terminal of the second detection device 9 for monitoring the laser light output from the resonator 1.

The example of the circuit system of the laser light generating apparatus will be described with reference to FIG. 2. A terminal $t_D$ is an input terminal of data used for intensity control of the output laser light, namely for carrying out output modulation thereof. When the laser light generating apparatus is used to generate light for magneto-optical recording, a recording data signal is input to the terminal $t_D$.

An amplitude modulator 11 modulates an amplitude of a carrier signal having a frequency fm such as 10 MHz supplied from an oscillator 10. The amplitude modulator 11 thereby controls a phase modulation index $\beta$ thereof to have a desired value. Then the modulated carrier signal is supplied to a phase modulator 5 through a first driver 12 of the phase modulator 5 and the terminal $t_1$. Thus, the laser light from the light source 4 is modulated with a modulation index $\beta$ in response to the data. The output laser light is controlled in accordance with control of the resonator reflected light intensity as described with reference to FIG. 9 through FIG. 13.

A detection signal of an intensity of the laser light output from the second detection device 9 is supplied through the terminal $t_4$ to a current I - voltage V conversion apparatus 13 and converted thereby to a voltage signal. The voltage signal is input to an APC (automatic power control) circuit 14. The APC circuit controls the amplitude modulator 11 so that the phase modulation index $\beta$ should be increased in response to the output laser light intensity. Namely, when the output laser light is large, the phase modulation index $\beta$ is increased. Thus, the phase modulator 5 is controlled by controlling the amplitude modulator 11. Namely, the modulation index $\beta$ is controlled in response to the output laser light intensity to automatically control the output of the output laser light similarly as described above.

A detection current signal of the first detection device 8 such as a photo diode supplied from the terminal $t_2$ is converted by a current I - voltage V conversion apparatus 15 to a voltage signal. The voltage signal is divided into a signal of a high frequency band and a signal of a low frequency band by a high-pass filter 16 and low-pass filter 17.

A resonator-length error signal is generated from the signal of the high frequency band according to the above-mentioned Drever Locking method. The signal of the low frequency band side is used as a detection signal for discriminating the locked state of the resonator 1 or a setting signal for the locked state.

Since a high frequency component of the signal is cut by the low-pass filter 17, a resonator reflected light intensity signal, shown by a solid line in FIG. 3A, in response to the intensity of the reflected light from the resonator 1 is obtained from the low frequency band side thereof. When the resonator 1 is in its resonating state, the signal becomes minimum. When the resonator 1 is in its non-matched (non-resonating) state, the signal indicates high level.

On the other hand, a direct current component of the detection signal of the reflected light from the resonator 1 is cut by the high-pass filter 16. The signal output from the high-pass filter 16 is multiplied at a multiplier 18 with a signal sin $\omega_m t$ obtained by delaying a carrier frequency for phase modulation supplied form the oscillator 10 by a delay circuit 19 by a predetermined amount. Further, a high frequency component of an output from the multiplier 18 is cut by a low-pass filter 20 to obtain the resonator-length error signal shown by a solid line in FIG. 3B.

An output from the low-pass filter 17 is input to a comparator 21 and also input at the same time to a microcomputer 22. A reference voltage being a threshold level is shown by a broken line in FIG. 3A. The reference voltage is calculated from a value of the resonator reflected light intensity signal indicating the non-resonating state, wherein the level of the resonator reflected light is high. The reference voltage is output from the microcomputer 22 and input to the comparator 21. Thus, with following a level in the non-matched (non-resonating) state of the resonator reflected light intensity as shown by a broken line in FIG. 3A, the resonator-length error signal, shown by a solid line in FIG. 3B, supplied from the low-pass filter 20 is sampled and held by a sampling and holding circuit 23 at a threshold value which is lower than the above level by a certain amount, thereby obtaining held data shown by a broken line in FIG. 3B.

Then, the actuator 3 is controlled by the data output of the held non-resonating state to move the reflection device $M_1$ of the resonator 1 minutely so as to lock the resonator 1 in its resonating state. However, as described above, when the modulation index $\beta$ is controlled, the amplitude of the resonator-length error signal is changed. Because a band and gain of the servo loop thereby change, the servo loop becomes unstable and sometimes may become oscillated and unlocked.

In order to solve this problem, the resonator-length error signal is divided by a function $f(\beta)$, which is a function of the modulation index $\beta$, and automatic-gain controlled by an AGC (automatic gain control) circuit 24 in FIG. 2. Namely, it can be considered that the resonator-length error signal is substantially in proportion to values of $J_0(\beta) \cdot J_1(\beta)$ so that the following Equation (8) is established. A value $\beta$ is calculated from an amplitude of the modulation signal supplied from the amplitude modulator 11 to the phase modulator 5. Then, a value of $J_0(\beta) \cdot J_1(\beta)$ corresponding to the value of $\beta$ is delivered from a ROM (Read Only Memory) circuit 25 to calculate a value of $f(\beta)$. Further, the automatic gain control is effected by the AGC circuit 24 by using the value of $f(\beta)$.

$$f(\beta)=|E_0|^2 J_0(\beta) \cdot J_1(\beta) \tag{8}$$

An output thus automatic-gain controlled by the AGC circuit 24 is phase-compensated by a phase compensation circuit 26 wherein a deviation of a phase of the electromagnetic coil such as the actuator 3 is compensated in a servo band. The phase-compensated output is input to a second driver 27 of the actuator 3 to drive the actuator 3.

Further, an on/off circuit 28 controlled by the microcomputer 22 is provided between the phase compensation circuit 26 and the second driver 27 to drive the actuator 3. Namely, the locking operation is performed during a certain time. As described above, the resonator reflected light intensity signal shown in FIG. 3A is obtained from the low-pass filter 17. Then, the detection signal shown in FIG. 3C is obtained from the resonator reflected light intensity signal. A locking point is detected by the detection signal. The microcomputer 22 controls the on/off circuit 28 to turn it off a certain time after detecting the locking point. In another word, although a setting loop is forcibly formed during a certain time after detection of the locking time, the setting loop is opened after the certain time is elapsed.

When the locking operation is started or the locking operation is not started, the second driver 27 drives to forcibly move the actuator 3 minutely. The above described operation including locking operation is repeated again and again.

In the embodiment described above, the resonator-length error signal is automatically controlled by the AGC circuit 24 in response to deviation of a phase applied to the phase modulator 5 so as to phase-modulate the light incident on the resonator 1 from the light source 4. While the resonator-length error signal can be automatically controlled by detecting the intensity of the incident laser light.

Figure 4:
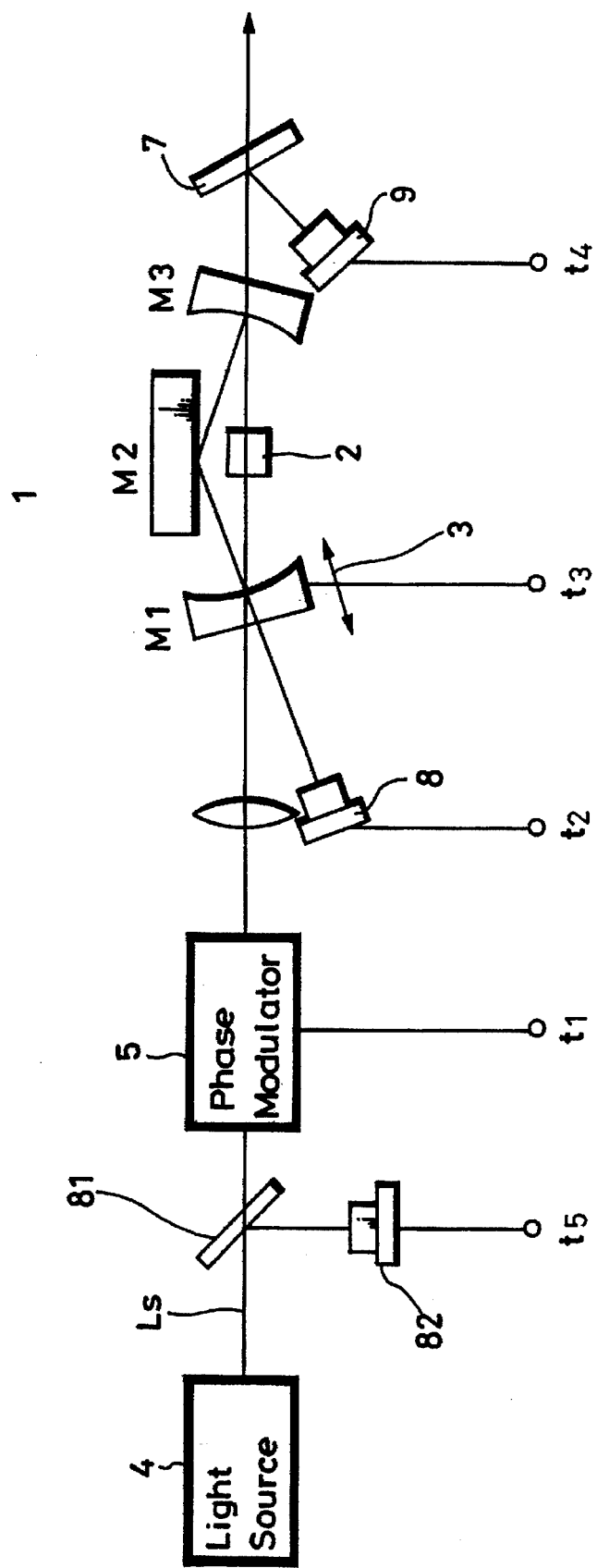
FIG. 4 is a schematic view showing an optical system of a laser light generating apparatus according to another embodiment of the present invention.
Figure 5:
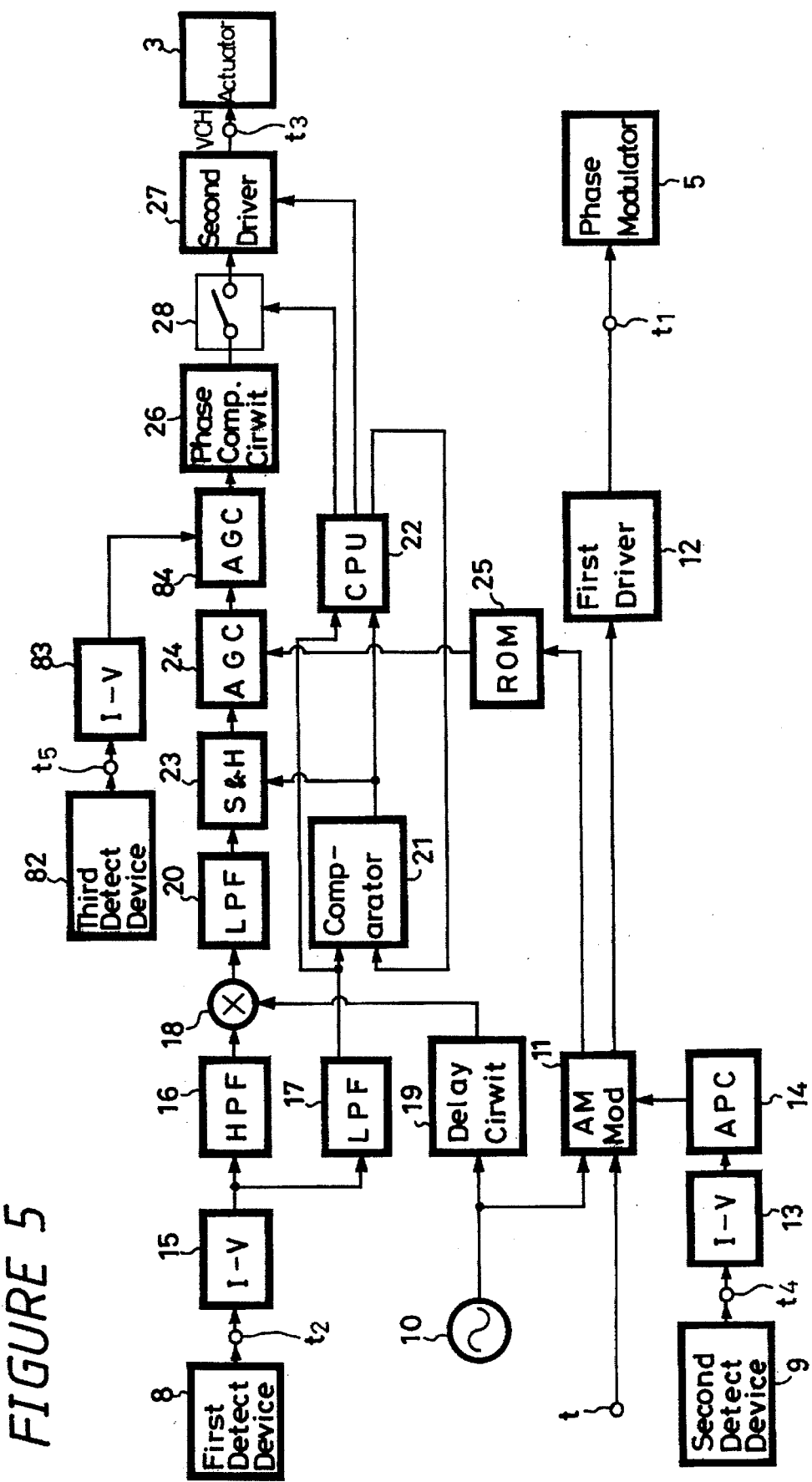
FIG. 5 is a block diagram showing a circuit system of a laser light generating apparatus according to another embodiment of the present invention.

An example of this arrangement is shown in FIG. 4 and FIG. 5. Light output from the light source 4 is branched by a beam splitter 81 and detected by a thick detection device 82 such as a photo diode or the like. The detected light is converted by a current I - voltage V convertor 83 to a voltage signal. The voltage signal controls an AGC circuit 84 provided at the next stage of the AGC circuit 24 so as to automatically control the resonator-length error signal in response to the intensity of the incident laser light.

In each of the above-mentioned embodiments, the laser light incident on the resonator 1 is phase-modulated by the phase modulator 5, while the incident laser light can be frequency-modulated. In this case, the oscillator 10 is replaced with a carrier frequency oscillator for supplying a carrier frequency to frequency modulation means.

According to the above-mentioned arrangement, the sampled and held resonator-length error signal and the resonator reflected light intensity signal are used as the setting signal when the resonator 1 is locked. Thereby, apparently a continuous resonator-length error signal is formed. With such arrangement, the resonator 1 can reliably be set in its locked state.

When the resonator 1 starts to be set in its locked state or the resonator 1 is not locked upon the locking operation, the movable reflection device $M_1$ of the resonator 1 is moved so that its resonator length is forcibly changed to obtain the resonator length error signal. Therefore, even if the resonator length is in the non-matched state, in other words, the resonator is in the non-resonating state, the resonator-length error signal can reliably be obtained and the resonator 1 can reliably be set in its locked stat by using the resonator-length error signal.

The threshold value used for detection of the intensity of the reflected light from the resonator 1 is set, following a predetermined value with respect to the resonator reflected light intensity obtained in the non-matched state. Therefore, even if the amplitude of the resonator reflected light intensity is fluctuated due to some causes, such as fluctuation of the incident laser light or the like, the stable sampling and holding operation can constantly be carried out.

After the locking point is detected, the setting loop is forcibly operated during a certain time. Therefore, the apparently continuous resonator-length error signal can avoid abnormal operations of the actuator 3 caused when an operation current flows to the actuator 3 for a long period of time, such as that since a large acceleration of the actuator's operation is caused, the actuator 3 does not stop the movable reflection device at a predetermined position and moves it beyond the position to thereby allow the movable reflection device to be moved without control.

In the above-mentioned arrangement, in response to the deviations of the phase and frequency applied to the incident laser light and the intensity of the incident laser light, the above resonator-length error signal is automatically gain-controlled. Therefore, the resonator-length error signal is prevented from being changed largely so that it can be avoided that the setting loop becomes unstable and the oscillation is generated because the gain of the servo circuit is changed.

When the intensity of the output laser light is modulated by using the data signal, the phase modulation index β of the incident laser light is changed. Therefore, the output laser light can be reliably be modulated with a simple arrangement.

Figure 6:
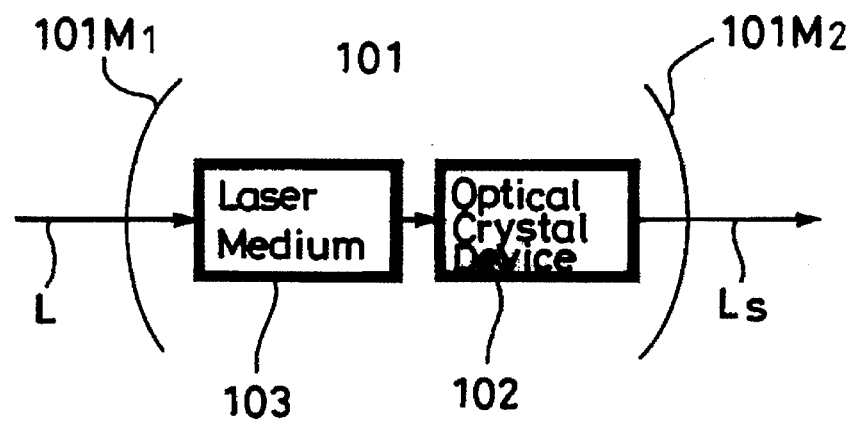
FIG. 6 is a schematic diagram showing a laser light generating apparatus according to another embodiment of the present invention.
Figure 7:
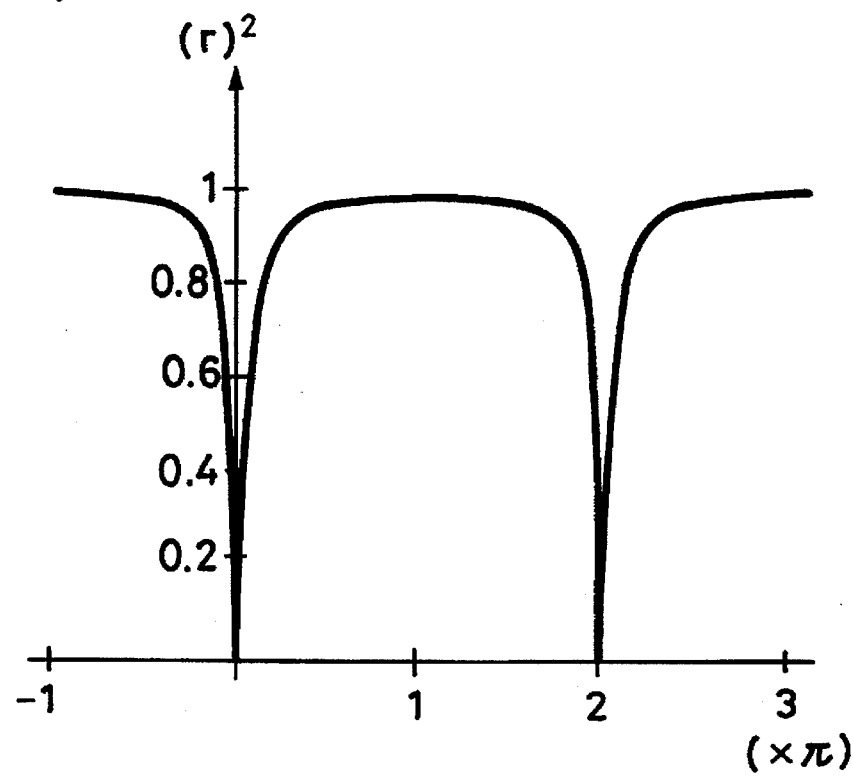
FIG. 7 is a graph showing the resonator reflected light intensity according to the present invention.
Figure 8:
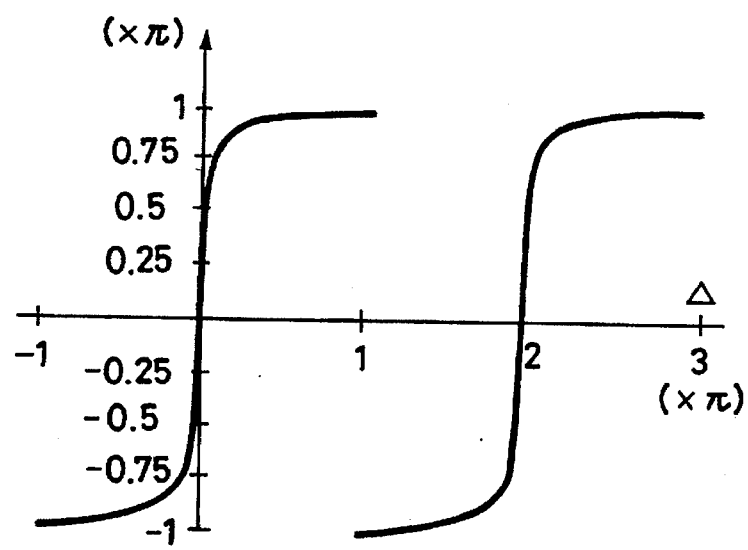
FIG. 8 is a graph showing a reflectivity phase of the resonator according to the present invention.
Figure 9:
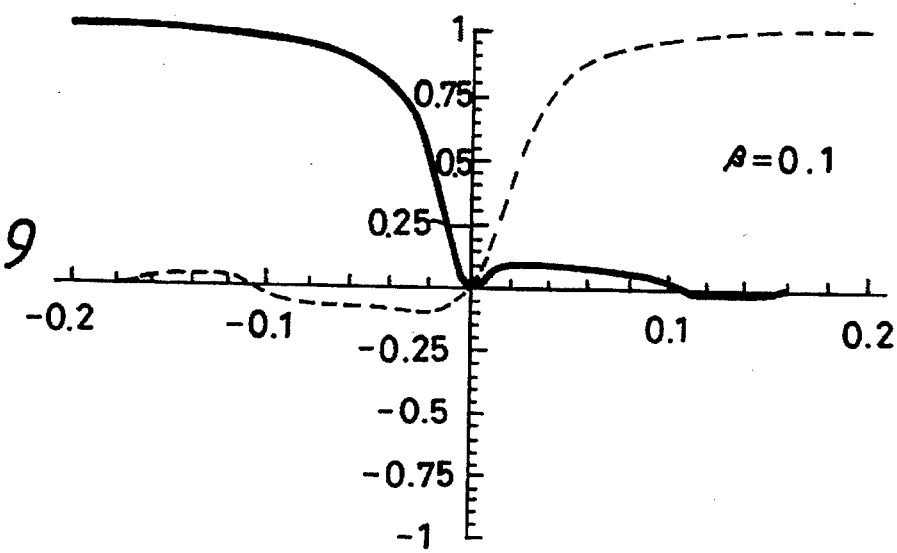
FIG. 9 is a characteristic graph showing an index of reflected light and an error signal.
Figure 10:
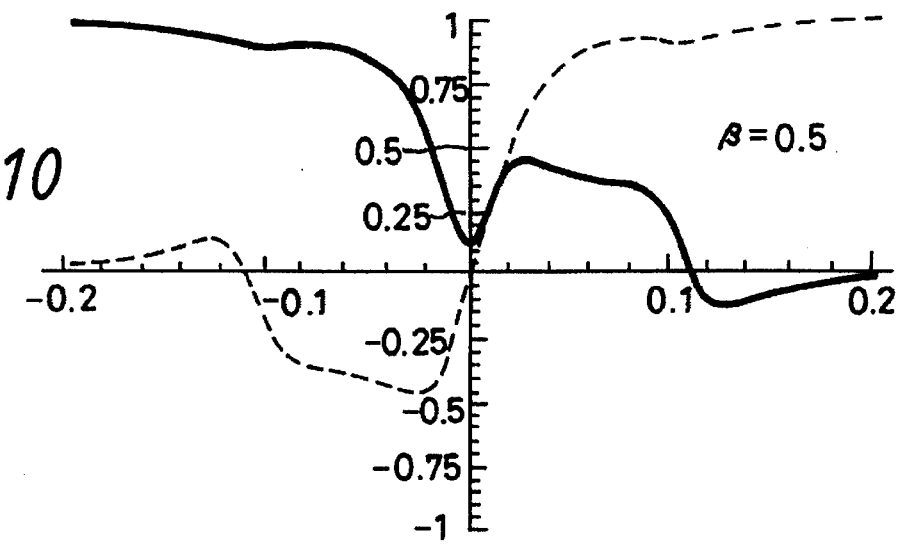
FIG. 10 is a characteristic graph showing the index of the reflected light and the error signal.
Figure 11:
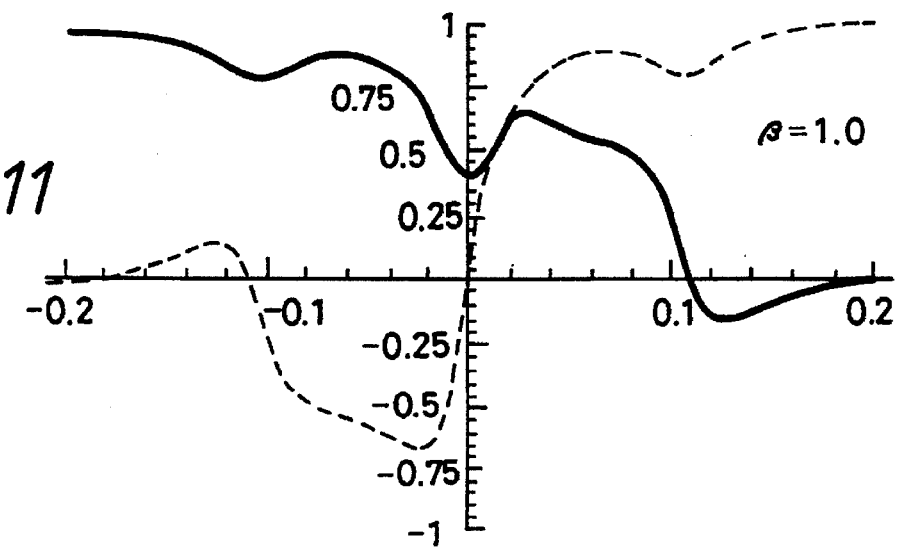
FIG. 11 is a characteristic graph showing the index of the reflected light and the error signal.
Figure 12:
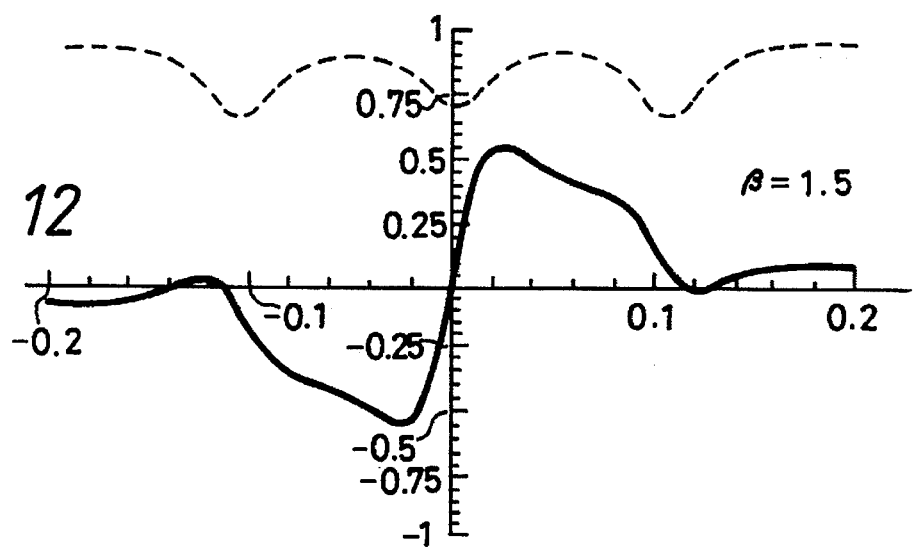
FIG. 12 is a characteristic graph showing the index of the reflected light and the error signal.
Figure 13:
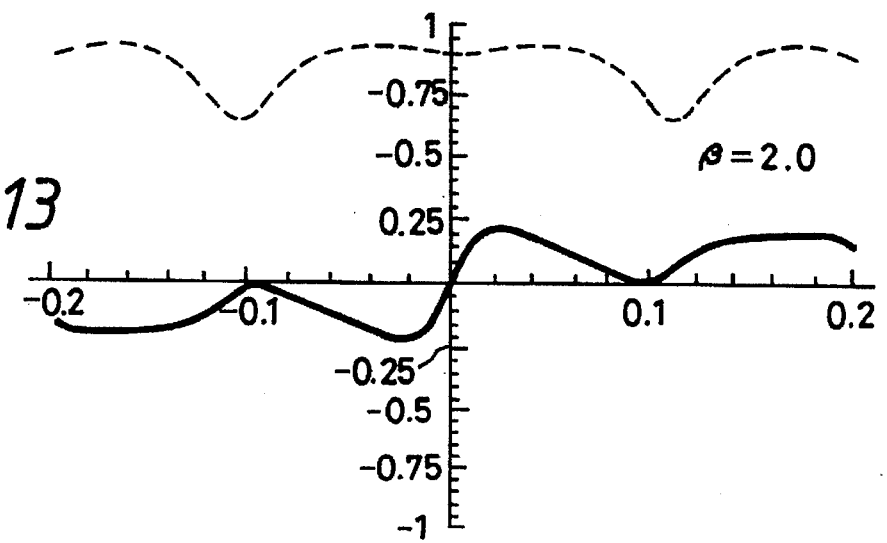
FIG. 13 is a characteristic graph showing the index of the reflected light and the error signal.

In the above-mentioned arrangement, a laser can be used as the light source 4 as shown in FIG. 6 which schematically shows the arrangement. According to an arrangement of the laser, a resonator 101 has a pair of reflection device $101M_1$ and $101M_2$, for example, a laser medium made of Nd:YAG (yttrium aluminum garnet), for example, and nonlinear optical crystal device 102 are disposed in the resonator 101. Laser light L emitted from a semiconductor laser, for example, is made incident on the resonator 101. The incident light is applied to a laser medium 103 as a pumping light to excite the laser medium 103 for generating a laser light. The laser light is further made incident on the nonlinear optical crystal device 102 as the fundamental wave laser light and subjected to wavelength conversion thereby to obtain a laser light $L_S$ with its wavelength of 532 nm, for example.

In this case, the above-mentioned arrangement according to the present invention can be applied to the light source 4. Specifically, in this case, for example, one of the reflection device $101M_1$ composing the resonator 101 is arranged as the movable reflection device having an actuator and similarly to the operations described with reference to FIGS. 2 and 3, there are carried out phase modulation of the laser light incident on the resonator 101 from the light source 4, i.e. the light for optical pumping, control of the resonator length and so on.

However, the above-mentioned light source 4 is not limited to that having arrangement described with reference to FIG. 6. The light source 4 can be formed of other devices, such as a solid laser in which the wavelength conversion is not carried out by the nonlinear optical crystal device, a semiconductor laser in which the light source 4 itself oscillates a laser light with a desired wavelength or the like.

The above-mentioned nonlinear optical crystal devices 2 and 102 are formed of a wavelength conversion device made of materials, such as BBO, KTP ($KTiOPO_4$), LN ($LiNbO_3$), QPLMN (pseudo phase matching LN), LBO ($LiB_3O_4$), KN ($KNbO_3$) or the like. The output laser light is not limited to the second harmonic of the fundamental wave laser and higher harmonics of higher order than the second harmonic can be employed as the output laser light.

As the laser medium 103, other materials, such as Nd:$YVIO_4$, LNP ($LiNdP_4O_{12}$), Nd:BEL or the like, than the above ND:YAG can be employed.

The actuator 3 is not limited to the electromagnetic actuator and the actuator 3 can be formed of a piezoelectric element, for example.

As described above, according to the arrangement of the present invention, since the resonator-length error signals obtained in a discrete fashion are set as the apparently continuous signal, the resonator length can reliably be locked.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the appended claims.

What is claimed is:

1. A laser light generating apparatus comprising:

A light source generating a light beam of a fundamental wave length;

a resonator comprising a pair of reflection devices reflecting said light beam of said fundamental wave length;

a non-linear optical crystal device located between said reflection devices and generating a light beam of harmonic wave length when said light beam of said fundamental wave length is input thereto;

a driving device for moving at least one of said reflection devices to control a resonator length of said resonator so that said resonator resonates in said fundamental wave length;

a first detection device for detecting said light beam of said fundamental wave length output and generating a detection signal; and control means for deriving a plurality of control signals, including a resonator length error signal and a resonator reflected light intensity signal from said detection signal, and for setting said driving device in its locked state, wherein said resonator length error signal is sample-held, and said driving device is actuated in response to said sample-held resonator length error signal.

2. A laser light generating apparatus according to claim 1, said control means comprises an error signal generating portion for generating said resonator length error signal based on said detection signal and an intensity signal generating portion for generating said resonator reflected light intensity signal based on said detection signal.

3. A laser light generating apparatus according to claim 2, said error signal generating portion comprises a high-pass filter for letting high frequency component of said detection signal pass, a multiplier for multiplying an output from said high-pass filter by an output from an oscillator and a first low-pass filter for letting low frequency component of an output from said multiplexer pass.

4. A laser light generating apparatus according to claim 2, said intensity signal generating portion comprises a second low-pass filter for letting low frequency component of said detection signal pass.

5. A laser light generating apparatus according to claim 2, said control means comprises a sample-hold means for sample-holding said resonator length error signal output from said error signal generating portion and a comparator for comparing said resonator reflected light intensity signal from said intensity signal generating portion with a reference signal, wherein said sample-hold means sample-holds said resonator length error signal based on a result output from said comparator.

6. A laser light generating apparatus according to claim 5, said control means comprises a switch for supplying said sample-held resonator length error signal to said driving device based on a result output from said comparator.

7. A laser light generating apparatus according to claim 1, said laser light generating apparatus further comprises a phase-modulation means for phase-modulating said light beam of said fundamental wave length output from said light source.

8. A laser light generating apparatus according to claim 7, said laser light generating apparatus further comprises a first auto-gain control means for providing an auto-gain control to said sample-held resonator length error signal based on a modulation rate of a phase-modulation signal supplied to said phase-modulation means.

9. A laser light generating apparatus according to claim 8, said laser light generating apparatus further comprises a second detection means for detecting said light beam of said fundamental wave length output and a second auto-gain control means for providing an auto gain control to an output signal from said first auto-gain control means based on an output signal from an output signal from said second detection means.

* * * * *